United States Patent

Pyles

[11] Patent Number: 4,535,104
[45] Date of Patent: Aug. 13, 1985

[54] ULTRAVIOLET LIGHT STABILIZED COPOLYESTERCARBONATE

[75] Inventor: Robert A. Pyles, Evansville, Ind.

[73] Assignee: General Electric Company, Mt. Vernon, Ind.

[21] Appl. No.: 633,116

[22] Filed: Jul. 20, 1984

[51] Int. Cl.³ ............................................. C08K 5/27
[52] U.S. Cl. .................................. 524/91; 524/599; 524/601; 524/604; 524/605
[58] Field of Search .............. 524/91, 599, 601, 604, 524/605

[56] References Cited

U.S. PATENT DOCUMENTS

| | | | |
|---|---|---|---|
| 3,004,896 | 10/1961 | Heller et al. | 524/91 |
| 3,322,719 | 5/1967 | Pielstocker | 524/91 |
| 3,823,113 | 7/1974 | Reisman | 524/91 |
| 3,864,354 | 2/1975 | Irick, Jr. et al. | 524/91 |
| 3,892,889 | 7/1975 | Cohnen et al. | 524/91 |
| 4,089,839 | 5/1978 | Jancis | 524/91 |
| 4,235,999 | 11/1980 | Irick, Jr. et al. | 524/91 |
| 4,278,589 | 7/1981 | Dexter et al. | 524/91 |
| 4,278,590 | 7/1981 | Dexter et al. | 524/91 |
| 4,283,327 | 8/1981 | Dexter et al. | 524/91 |
| 4,403,053 | 9/1983 | Lewis | 524/91 |

Primary Examiner—Lester L. Lee
Attorney, Agent, or Firm—Martin B. Barancik

[57] ABSTRACT

A composition comprising an aromatic copolyestercarbonate article surface impregnated with an ultraviolet light degradation inhibiting effective amount of a compound of the formula

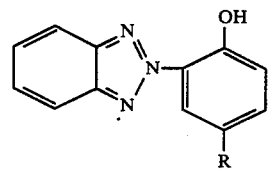

wherein R is hydrogen or alkyl of one to twelve carbon atoms, inclusive.

12 Claims, No Drawings

ULTRAVIOLET LIGHT STABILIZED COPOLYESTERCARBONATE

BACKGROUND OF THE INVENTION

Most plastic articles are subject to an increase in yellowness after aging under an ultra violet source. For example, polycarbonate has increased Y.I., yellowness index as measured by ASTM D 1925-63T, after exposure to ultra violet light. The usual method of inhibiting the yellowing of polymers caused by ultraviolet light is the addition of an additive to the bulk material prior to extrusion. This method, known as bulk stabilization, is generally quite successful in inhibiting the degradation of the polymer.

Polyarylates are well known to have severe yellowing problems when exposed to ultraviolet light. Although not totally understood, it is thought that this yellowing is due to a photo-Fries rearrangement occuring at the ester bond linkage to an aryl group. This ultra violet light promoted reaction results in a rearrangement of the type illustrated below

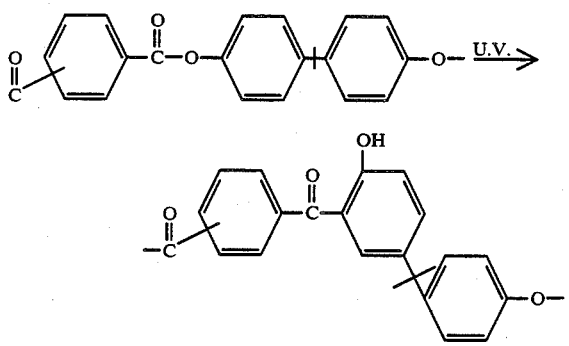

This type of degradation leaves a layer on the surface of the polyarylate which is the product of the photo-Fries rearrangement. If such product is colored, the plastic article surface will quite rapidly assume that color. Since this is a surface phenomenon, a point is reached, usually after a relatively short period of exposure to the sun, wherein the rate of yellowing of the underlying polymer is significantly reduced. When such mechanism of degradation is occurring, bulk stabilization provides an insufficient amount of additive at the surface of the article to inhibit the yellowing. A different method of stabilization is required.

Aromatic copolyestercarbonates have similar problems. A yellow surface coloring occurs after exposure to an ultraviolet source. Attempts by the inventor to impregnate the surface of the copolyestercarbonate with seemingly appropriate ultraviolet inhibitors have not proved successful.

A special class of ultraviolet inhibitors has been discovered. This class does provide very good ultraviolet stability when impregnated upon the surface of an article prepared from aromatic copolyestercarbonate.

DESCRIPTION OF THE INVENTION

In accordance with the invention, there is a composition comprising an aromatic copolyestercarbonate article surface impregnated with an ultraviolet light degradation inhibiting effective amount of a compound of the formula

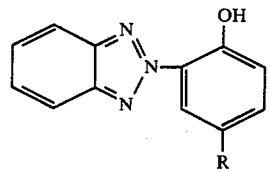

wherein R is hydrogen or an alkyl of one to about twelve carbon atoms, inclusive.

The aromatic copolyestercarbonates of this invention are prepared by reacting a dihydric phenol, a carbonate precursor and an aromatic ester precursor.

The dihydric phenols useful in preparing the aromatic copolyester carbonates which are used in the practice of this invention are in general represented by the formula

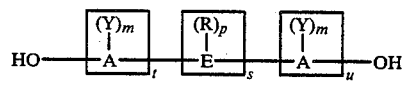

wherein A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g., cyclopentyl, cyclohexyl, etc.); a sulfur containing linkage, such as sulfide, sulfoxide or sulfone; an ether linkage; a carbonyl group; a tertiary nitrogen group; or a silicon-containing linkage such as silane or siloxy. R represents hydrogen or a monovalent hydrocarbon group such as alkyl(methyl, ethyl, propyl, etc.), aryl(-phenyl, naphthyl, etc.), aralkyl(benzyl, ethylphenyl, etc.), alkaryl, or cycloaliphatic(cyclopentyl, cyclohexyl, etc.). Y may be an inorganic atom such as halogen(fluorine, bromine, chlorine, iodine), an inorganic group such as the nitro group, a group such as R above, or an oxy group such as OR, it being only necessary that Y be inert to and unaffected by the reactants and reaction conditions. The letter m represents any integer from and including zero through the number of positions on A available for substitution; p represents an integer from and including zero through the number of positions on E available for substitution; t represents an integer equal to at least one; s is either zero or one; and u represents any integer including zero.

In the dihydric phenol compound represented by Formula I above, when more than one Y substituent is present, they may be the same or different. The same hold true for the R substituent. Where s is zero in Formula I and u is not zero, the aromatic rings are directly joined with no intervening alkylene or other bridge. The positions of the hydroxyl groups and Y on the aromatic nuclear residues A can be varied in the ortho, meta, or para positions and the groupings can be in vicinal, asymmetrical or symmetrical relationship, where two or more ring carbon atoms of the hydrocarbon residue are substituted with Y and hydroxyl groups.

Some nonlimiting examples of dihydric phenols falling within the scope of Formula I include:
2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,1-bis(4-hydroxy-2-chlorophenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

These dihydric phenols may be used alone or as mixtures of two or more different dihydric phenols.

The carbonate precursor may be a carbonyl halide, a carbonate ester or a haloformate. The carbonyl halides which can be employed herein are carbonyl chloride, carbonyl bromide and mixtures thereof. Typical of carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl)carbonate, etc.; di(alkylphenyl)carbonates such as di(tolyl)carbonate, etc., di(naphthyl)carbonate, di(chloronaphthyl)carbonate, phenyl tolyl carbonate, chlorophenyl chloronaphthyl carbonate, etc., or mixtures thereof. The haloformates suitable for use herein include bishaloformates of dihydric phenols(bischloroformates of hydroquinone, etc.) or glycols(bishaloformates of ethylene glycol, neopentyl glycol, polyethylene glycol, etc.). Carbonyl chloride, also known as phosgene, is preferred.

The aromatic ester precursor is any molecule that forms an aromatic ester bond under the reaction conditions of the polymerization. Generally the aromatic acid halides, for example the acid chloride and bromides, particularly the acid chlorides, are employed. Of the aromatic halides employed the simplest aromatic groups, the isophthaloyl dihalide and the terephthaloyl dihalide are preferred although alkyl and/or halo substituents on the aromatic ring can also be present. Mixtures of aromatic ester precursors can be employed. The molar ratio of terephthaloyl halide to isophthaloyl halide can vary from 0.2:9.8 to 10:90. It is preferred to have greater than 50 mole percent, more preferred to have greater than 70 mole percent of the copolyestercarbonate ester bonds as an isophthalate.

Also present during the co-reaction between the dihydric phenol, the carbonate precursor and the dicarboxylic acid or its reactive derivative are catalysts, molecular weight regulators, and acid acceptors. Examples of suitable molecular weight regulators include phenol, p-tertiary butyl phenol, etc. Examples of suitable catalysts include tertiary amines, quaternary ammonium compounds, quaternary acceptors include tertiary amines, alkali or alkaline earth metal hydroxides, etc.

The aromatic copolyestercarbonates can be prepared by any of the usual well known procedures, for example melt polymerization or interfacial polymerization Examples of procedures are in U.S. Pat. Nos. 3,169,121; 3,030,331; 4,194,038; 4,156,069; 4,238,596 and 4,238,597 all of which are incorporated by reference.

The aromatic copolyestercarbonates in general have from about 25 to about 90 mole percent ester bonds, preferably about 35 to about 80 mole percent ester bonds. If five moles of bisphenol-A react completely with four moles of isophthalic acid chloride and one mole of phosgene, an aromatic copolyestercarbonate having eighty mole percent ester bonds is prepared.

The choice of ultraviolet inhibiting additive studied was based upon the ultraviolet absorbance of the yellow surface material found on ultraviolet aged copolyestercarbonate. Since this material protects the underlying polymer against yellowing, any known ultraviolet stabilizer with approximately the same major absorbance frequency and equivalent extinction coefficient should protect the copolyestercarbonate equally well. However, in practice it was found that this was not the case. Most of the additives expected to provide protection against ultraviolet caused yellowing were ineffective to varying degrees. The only successful additives were compounds of the formula

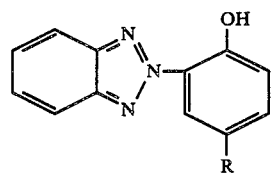

wherein R is hydrogen or alkyl of one to twelve carbon atoms, inclusive, preferably six to twelve carbon atoms, inclusive.

Below are experiments including the preparation of the copolyestercarbonate, the impregnation techniques and the ultraviolet stabilizer test results.

EXAMPLE 1

Preparation of the Copolyestercarbonates

Following the procedures of Quinn U.S. Pat. No. 4,238,596, a copolyestercarbonate was prepared from bisphenol-A, phosgene, isophthaloyl chloride, terephthaloyl chloride and a chain stopper, p-tertiary butyl phenol. The copolyestercarbonate has a weight percentage of 80 percent ester and 20% carbonate. Of the ester, 95 percent is isophthalate and 5 percent is terephthalate.

EXAMPLE 2

Impregnation of the Copolyestercarbonate

The copolyestercarbonate of Example 1 was extruded at 570° F. with 0.1 pph of an epoxy and 0.06 pph of a phosphite. The pellets were then injection molded at 650° F. into a step chip of dimensions $3 \times 2 \times \frac{1}{8}$ stepping to 1/16 inches. This step chip was then impregnated with various potential ultraviolet stabilizers dissolved in butoxyethanol at weight percent stabilizer in solution levels of 2, 4, 6, 8, 10, 12 and 20% using the following method: The ultraviolet stabilizer-butoxyethanol solution and the copolyestercarbonate chips were oven heated at 125° C. for fifteen minutes in glass bottles with screw tops and small aluminum pans, respectively. The stabilizer solution was poured over the chips and the aluminum pans containing the chips were gently rocked to thoroughly coat the chips. The chips were dried in a 150° C. oven for one hour.

The impregnated copolyestercarbonate chips were then ultraviolet aged on a rotating carousel positioned 8 inches below six 275 watt General Electric sunlamps. The surface temperature of the carousel was about 55°

C. Y.I. was measured on a Gardner XL-23 Colorimeter according to ASTM D 1925-63T. The control sample is the chip without any butoxyethanol. Below are the results:

A. Stabilizer N-(p-ethoxycarbonylphenyl)-N'-ethyl-N'-phenyl formamidine (Givsorb UV-2 obtained from Givaudan Corporation) 20 weight percent.

| RUN 1 | | | RUN 2 | | |
|---|---|---|---|---|---|
| TIME (HRS) | Y.I. SAMPLE | CONTROL | TIME (HRS) | Y.I. SAMPLE | CONTROL |
| 0 | 5.28 | 4.39 | 0 | 7.00 | 6.59 |
| 96 | 8.11 | 11.80 | 24 | 7.70 | 11.78 |
| 168 | 9.17 | 12.90 | 48 | 8.55 | 13.40 |
| 204 | 11.10 | 13.85 | 120 | 12.40 | 15.15 |
| 360 | 13.24 | 14.56 | 168 | 13.55 | 15.42 |
| 384 | 16.25 | 15.05 | 192 | 14.42 | 15.64 |
| 456 | 17.11 | 14.90 | 288 | 18.31 | 15.86 |
| | | | 312 | 18.46 | 15.94 |
| | | | 336 | 19.74 | 15.98 |

As is shown in the two runs using the formamidine ultraviolet inhibitor, the initial results appear to show effectiveness as an inhibitor for these materials. However, after prolonged exposure to the sunlamps, the yellowing of the impregnated article was actually worse than the control non-impregnated article.

B. Disodium 2,2'-dihydroxy-4,4'-dimethoxybenzophenone (Uvinul D-49 obtained from BASF Wyandotte) 20 weight percent.

| TIME (HRS) | Y.I. SAMPLE | CONTROL |
|---|---|---|
| 0 | 14.47 | 4.30 |
| 15 | 14.28 | 9.55 |
| 39 | 14.15 | 10.93 |
| 63 | 14.46 | 13.32 |
| 87 | 14.38 | 12.54 |
| 159 | 15.78 | 13.63 |
| 183 | 15.03 | 13.78 |
| 255 | 15.68 | 14.23 |
| 327 | 16.02 | 14.43 |

The data shows that the ultraviolet stabilizer impregnated surface had more yellowing than the control sample from the initial impregnation.

C. Palmitoyl-3,5-di-tert.butyl-4-hydroxybenzoate (Cyasorb UV-2908 obtained from American Cyanamid) 20 weight percent.

| TIME (HRS) | Y.I. SAMPLE | CONTROL |
|---|---|---|
| 0 | 7.32 | 7.90 |
| 96 | 13.55 | 14.45 |
| 480 | 15.09 | 15.92 |
| 1032 | 17.05 | 17.29 |

This benzoate ultraviolet stabilizer provides essentially no protection to the impregnated article.

D. A hindered amine (Spinuvex A-36 obtained from Borg Warner) 20 weight percent.

| TIME (HRS) | Y.I. SAMPLE | CONTROL |
|---|---|---|
| 0 | 11.55 | 7.90 |
| 96 | 20.59 | 14.45 |
| 480 | 21.00 | 15.92 |
| 1032 | 20.58 | 17.29 |

The hindered amine stabilizer appears to impart more yellowing than the control to the initially impregnated article.

E. Ethyl-2-cyano-3,3-diphenylacrylate (Uvinul N-35 obtained from BASF Wyandotte) 20 weight percent.

| TIME (HRS) | Y.I. SAMPLE | CONTROL |
|---|---|---|
| 0 | 8.12 | 9.02 |
| 40 | 8.58 | 13.88 |
| 136 | 11.83 | 14.69 |
| 520 | 13.51 | 16.05 |
| 1072 | 14.63 | 17.73 |

This cyanoacrylate ultraviolet stabilizer shows fair success at stabilizing the yellowing of the copolyestercarbonate article.

F. 2-hydroxy-4-n-octoxybenzophenone (Uvinul 408 obtained from BASF Wyandotte) 20 weight percent.

| TIME (HRS) | Y.I. SAMPLE | CONTROL |
|---|---|---|
| 0 | 8.24 | 9.02 |
| 40 | 10.74 | 13.88 |
| 136 | 9.20 | 14.69 |
| 520 | 10.14 | 11.33 |
| 1072 | 11.33 | 17.73 |

This benzophenone ultraviolet stabilizer is moderately successful in stabilizing the copolyestercarbonate article.

As stated previously all the above ultraviolet stabilizers were selected on the basis of having absorbancy maximum at or near the maximum of the yellow surface of the copolyestercarbonate after exposure to ultraviolet radiation. Extinction coefficients were matched as well. However, successful ultraviolet yellowing inhibition was not achieved.

The following compounds of the formula claimed in this invention provided very good ultraviolet stabilization to the article.

G. 10 Weight %-2-(2-hydroxy-5-methylphenyl)benzotriazole (Tinuvin P obtained from Ciba Geigy).

| TIME (HRS) | Y.I. SAMPLE | CONTROL |
|---|---|---|
| 0 | 5.07 | 4.39 |
| 96 | 7.51 | 11.80 |
| 168 | 7.25 | 12.90 |
| 264 | 7.63 | 13.85 |
| 360 | 8.25 | 14.56 |
| 384 | 8.84 | 15.05 |
| 456 | 8.52 | 14.90 |

The benzotriazole substantially inhibits the yellowing caused by the sunlamps. The control increases a total of 10.5 Y.I. units while the impregnated sample only increases 3.5 Y.I. units.

H. 2-(2-hydroxy-5-octylphenyl)benzotriazole (Cyasorb-5411 obtained from American Cyanamid) 12 weight percent. The octyl is

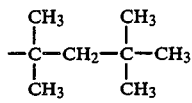

| TIME (HRS) | Y.I. SAMPLE | CONTROL |
|---|---|---|
| 0 | 4.54 | 4.60 |
| 60 | 5.16 | 12.83 |
| 84 | 5.37 | 13.25 |
| 108 | 5.64 | 13.72 |
| 132 | 5.85 | 13.95 |
| 156 | 6.05 | 14.11 |
| 228 | 6.58 | 14.82 |
| 276 | 6.77 | 15.18 |
| 300 | 6.84 | 15.18 |
| 365 | 7.04 | 15.21 |
| 389 | 7.04 | 15.19 |
| 413 | 7.12 | 15.39 |

This second benzotriazole also substantially inhibits the yellowing caused by the sunlamps. The control increases a total of 10.5 Y.I. units while the impregnated sample only increases 2.5 Y.I. units.

EXAMPLE 3

The stabilizer from Sample H, 2-(2-hydroxy-5-t.octylphenyl)benzotriazole was impregnated on a chip in a similar manner as in Example 2 and placed in a QUV Accelerated Weathering Tester (T Q-Panel Company) together with a control. The part was exposed to simulated weathering conditions (UV light 8 hr. and condensate 4 hr. in a 12 hr. cycle) for a total ultraviolet light exposure time of 596 hours out of a total of 840. Below are the results.

| TIME, HOURS (ACTUAL LIGHT) | [TOTAL TIME] | Y.I. RUN 1 | RUN 2 | CONTROL |
|---|---|---|---|---|
| (0) | [0] | 4.4 | 5.0 | 4.6 |
| (120) | [168] | 4.9 | 5.9 | 10.5 |
| (237) | [334] | 5.0 | 6.0 | 11.0 |
| (354) | [501] | 5.2 | 6.1 | 11.3 |
| (472) | [667] | 5.4 | 6.1 | 11.2 |
| (596) | [840] | 5.2 | 6.2 | 11.6 |

As the data demonstrates, in simulated natural conditions, the benzotriazole performs very well. The protected copolyestercarbonate article gains an average of 1.0 Y.I. units while the untreated article gains 7.0 Y.I. units.

Although not explored in great depth, it is clear that the concentration of the ultraviolet stabilizer in the solvent does not necessarily guarantee that an adequate quantity of stabilizer will be delivered to the part surface. Substantial variations can be observed. For example a solution containing 2 percent stabilizer produced an article with a lower Y.I. value after 413 hours exposure to the sunlamps than an article impregnated using a 10 percent solution. The stabilizer solvent temperature, part temperature and curing oven temperature are also significant variables. The data in the specification is the best data achieved for each stabilizer tested.

What is claimed is:

1. A composition comprising an aromatic copolyestercarbonate article surface impregnated with an ultraviolet light degradation inhibiting effective amount of a compound of the formula

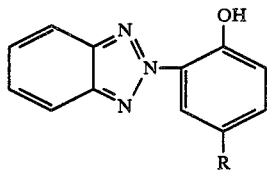

wherein R is hydrogen or alkyl of one to twelve carbon atoms, inclusive.

2. A composition in accordance with claim 1 wherein the mole percent ester of the copolyestercarbonate is from about 25 to 90 mole percent.

3. A composition in accordance with claim 2 wherein the aromatic ester in the copolyestercarbonate is predominantly isophthalate.

4. A composition in accordance with claim 2 wherein the aromatic ester in the copolyestercarbonate is predominantly terephthalate.

5. A composition in accordance with claim 3 wherein a dihydric phenol used in making the copolyestercarbonate is bisphenol-A.

6. A composition in accordance with claim 4 wherein a dihydric phenol used in making the copolyestercarbonate is bisphenol-A.

7. A composition in accordance with claim 2 wherein R is hydrogen.

8. A composition in accordance with claim 2 wherein R is methyl.

9. A composition in accordance with claim 2 wherein R is alkyl of six to twelve carbon atoms, inclusive.

10. A composition in accordance with claim 9 wherein R is octyl.

11. A composition in accordance with claim 9 wherein R is

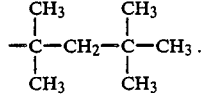

12. A composition in accordance with claim 1 wherein the copolyestercarbonate has from about 35 to 80 mole percent ester bonds.